United States Patent [19]

Wade

[11] Patent Number: 4,843,578

[45] Date of Patent: Jun. 27, 1989

[54] VEHICLE SPEED MONITORING AND LOGGING MEANS

[76] Inventor: Ted R. Wade, 202 Rolling Ridge Cir., Garner, N.C. 27529

[21] Appl. No.: 77,750

[22] Filed: Jul. 27, 1987

Related U.S. Application Data

[63] Continuation of Ser. No. 656,681, Oct. 1, 1984, abandoned.

[51] Int. Cl.⁴ .......................... G01P 3/56; G06M 7/00; B60Q 1/00; G06F 15/14
[52] U.S. Cl. .................................... 364/565; 324/161; 346/18; 340/441; 364/424.01; 377/9
[58] Field of Search ............... 364/436, 424, 565, 483; 340/52 R, 52 F, 53, 62, 63; 324/161; 346/18; 360/5; 377/9, 15, 23

[56] References Cited

U.S. PATENT DOCUMENTS

| 3,872,479 | 3/1975 | Ramsey | 346/18 X |
|---|---|---|---|
| 4,067,061 | 1/1978 | Juhasz | 340/52 F X |
| 4,072,850 | 2/1978 | McGlynn | 364/424 |
| 4,101,870 | 7/1978 | Ekman | 340/52 F X |
| 4,124,840 | 11/1978 | Kobayashi | 364/550 |
| 4,181,943 | 1/1980 | Mercer, Sr. et al. | 364/436 X |
| 4,223,297 | 9/1980 | Nomura | 340/62 |
| 4,236,142 | 11/1980 | Lindsey | 346/18 X |
| 4,258,421 | 3/1981 | Juhusz et al. | 340/52 F X |
| 4,341,995 | 7/1982 | Hennick | 324/161 |
| 4,395,624 | 7/1983 | Wartski | 377/15 |
| 4,400,783 | 8/1983 | Locke, Jr. et al. | 364/483 |
| 4,528,547 | 7/1985 | Rodney | 340/52 F X |
| 4,533,962 | 8/1985 | Decker et al. | 360/5 |
| 4,561,057 | 12/1985 | Haley, Jr. et al. | 364/436 |
| 4,692,882 | 9/1987 | Shovgaard et al. | 324/166 X |

Primary Examiner—Parshotam S. Lall
Assistant Examiner—Joseph L. Dixon

[57] ABSTRACT

This invention is a means for detecting and logging the number of instances that predetermined speeds have been exceeded. This device can be used by car owners to monitor their driving habits as well as those of others using the car. Also the device of the present invention can be used by insurance companies in determining insurance rates based on driving performance.

5 Claims, 2 Drawing Sheets

VEHICLE SPEED MONITORING AND LOGGING MEANS

This is a continuation of U.S. Patent application Ser. No. 06/656,681, filed Oct. 1, 1984, which is now abandoned.

FIELD OF INVENTION

This invention relates to scientific instruments and more particularly to automobile speed detecting and logging means.

BACKGROUND OF INVENTION

Soon after man began to drive horseless carriages, it became evident that excessive speed endangered not only the vehicle and its occupants but also surrounding persons and property. As it became necessary, speed laws were enacted and are today appliable to all jurisdictions in the country and have been refined to meet differing situations and conditions.

The National Safety Council, a nongovernmental, nonprofit public service organization chartered by Congress periodically publishes information relating to accidents and the prevention thereof. "Accident Facts" is one of these publications and the 1982 Edition thereof indicates that there were 50,800 deaths due to automobile accidents of which 33 percent were attributed to speeding. Likewise, there were 1,900,000 disabling injuries during the period and 20 percent of these involved excessive speed.

In addition to the above, 72 percent of all accidents involving persons in the 15 to 24 age group are caused by motor vehicles. Thus parents and older vehicle owners have a genuine interest and concern when drivers in this age group are behind the wheel.

Another interesting fact is that 82 percent of the fatal accidents and 70 percent of the injury accidents were under dry road conditions which effectively eliminates weather as a contributing factor.

The above-described accidents cost the American public 40.6 billion dollars or 46 percent of the cost of all accidents throughout the United States during the year.

BRIEF DESCRIPTION OF INVENTION

After much research and study into the above-mentioned problems, the present invention has been developed to provide a means for monitoring the number of times certain predetermined speed increments are exceeded. This is combined with a print-out system so that periodically the stored memory can be retrieved for performance monitoring purposes.

The above is accomplished by interfacing a magnetic speed sensor attached to the existing speedometer pickup on the transmission of the vehicle to a logging device which monitors the rate of pulses from the speed sensor. Whenever a rate of speed is greater than a predetermined level, the software in the logging device stores the incident. Multiple increments of speed can be detected and the instances of each level being reached is stored. Each such device includes a permanently stored identification number which, when stored information is needed, such identification number will print out along with the odometer reading and the cumulative occurrences of speed having been reached in each preset category.

In view of the above, it is an object of the present invention to provide a vehicle speed monitoring and logging device for recording excessive speeds.

Another object of the present invention is to provide a vehicle mounted monitoring and logging device which indicates the number of times a predetermined speed is exceeded.

Another object of the present invention is to provide a vehicle speed monitoring and logging device which records the number of times a plurality of predetermined speeds are exceeded.

Another object of the present invention is to provide a vehicle speed monitoring and logging device which will give a visual print-out of odometer reading, serial number, and the number of times predetermined speed levels have been exceeded.

Another object of the present invention is to provide a vehicle speed monitoring and logging device which, upon command, will print out the vehicle's odometer reading, the unique serial number of the logging device, date and time, and the number of times predetermined speed increments have been exceeded since the last print-out and the date of such print-out.

Another object of the present invention is to provide a vehicle speed monitoring and logging device in combination with visual and/or audible signals activated when predetermined speeds are exceeded.

Another object of the present invention is to provide, in combination with a vehicle speed monitoring and logging device, a visual and/or audible warning signal which intensifies as incremented higher predetermined speeds are exceeded.

Other objects and advantages of the present invention will become apparent and a study of the following description and the accompanying drawings which are merely illustrative of such invention.

DETAILED DESCRIPTION OF INVENTION

Figure 1:
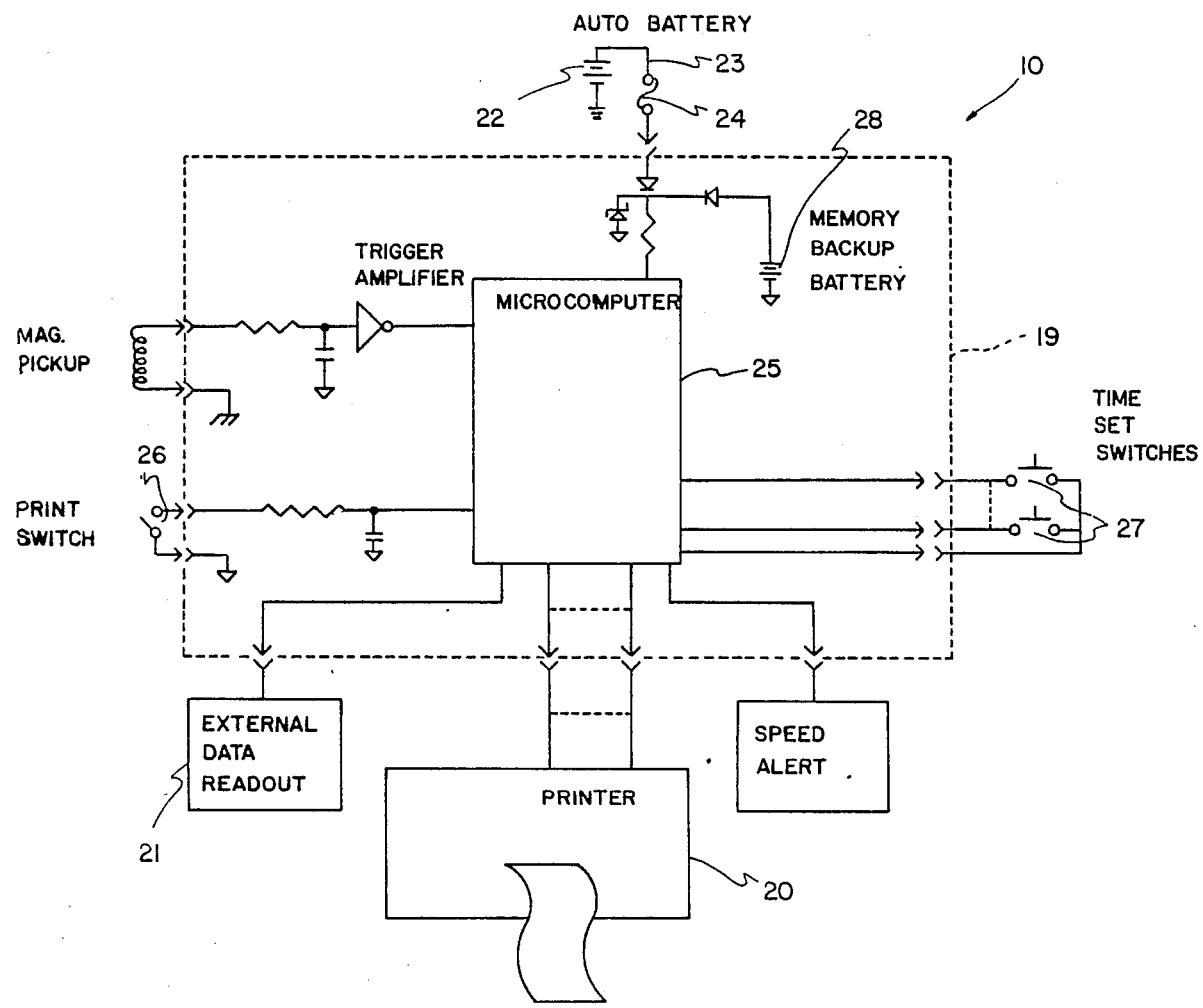
FIG. 1 is a schematic view of the vehicle speed monitoring and logging device of the present invention.

With further reference to the drawings, the speed monitoring and logging means of the present invention, indicated generally at 10, is mounted in a motor vehicle 11. This vehicle includes the usual wheels 12, engine 13, and drive train including transmission 14 and drive shaft 17.

By using either the existing speedometer cable and sender 15 from the transmission 14 or a special sensing cable indicated in dotted lines at 16 which is operative from drive shaft 17, magnetic pick-up 18 can sense speed for the monitoring and logging means of the present invention.

Unit housing 19 is operatively mounted under the dash 41 of vehicle 11 or at some other convenient location. If desired, the unit can be operatively connected to a printer 20, an external data read-out 21, and/or to an audio/visual speed alert means as will hereinafter be set forth in greater detail.

Figure 2:
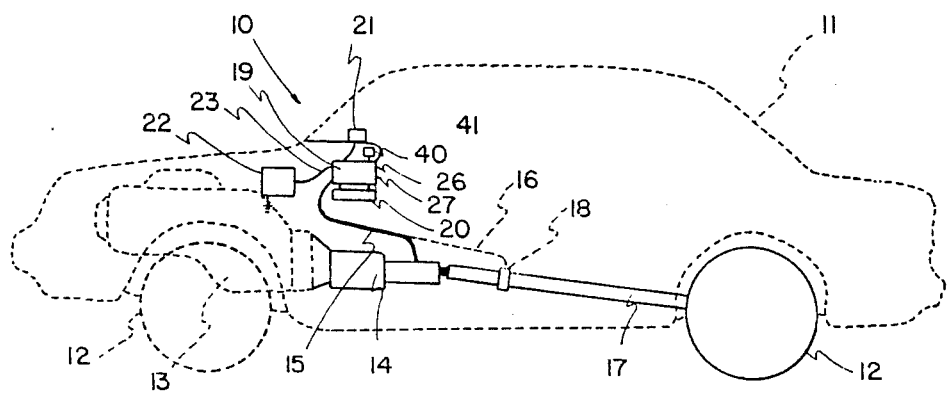
FIG. 2 illustrates the present invention mounted in a motor vehicle.

Finally in FIG. 2 a standard vehicle battery 22 is shown which furnishes primary power to the present invention. This battery 22 is connected through line 23 and fuse 24 to micro-computer 25 within housing 19.

Micro-computer 25 is preferably of the CMOS type, for example, Model COP-400 manufactured by National Semi-Conductor. Since micro-computers of this type are well known to those skilled in the art, further detailed description of the same and its manner of operation, except for function, is not deemed necessary.

The magnetic pick-up 18 is connected to the micro-computer 25 in the normal manner. Also time set switches 27 and a print switch 28 are operatively connected to said micro-computer.

An external data read-out is connected to the micro-computer 25 and is preferably of the LED type. Since read-outs of this type are well known to those skilled in the art, further detailed description of the same is not deemed necessary.

Finally, printer 20 is operatively connected to the micro-computer 25. This printer can be of any suitable type so long as it has alphanumeric capabilities. Model DMTP-3 Minature Alphanumeric Impact Metrics Printer manufactured by Practical Automation, Inc., of Shelton, Conn., has been found to be satisfactory for the purpose.

A back-up battery 28, preferably of the mercury type, is provided for mico-computer 25 in case the vehicle battery 22 becomes run down, disconnected or otherwise is rendered inoperative.

It is to be understood that all of the various components of the present invention mounted externally of unit housing 19, such as those described above, can be connected thereto by standard plugs to facilitate installation and removal for repair or other purposes. Since line plugs of this type are well known to those skilled in the art, further detailed discussion of the same is not deemed necessary.

Once the system 10 of the present invention has been operatively installed in vehicle 11, time set switches 27 can be manipulated. Since the micro-computer 25 has a real time clock implemented in its software, the time and date of the manipulation are recorded in the memory thereof.

As the vehicle 11 is driven, pulses from the magnetic speed sensor 18 are fed into the micro-computer 25. The rate of these pulses is monitored and upon detection of a rate of speed greater than a pre-set level, the software will store the incident along with, if desired, the time and data of occurrence in the memory as an increment count. Multiple rate of speed levels are stored such as over 55, over 60, over 65, over 70, over 75, etc. Thus as speed is sensed in excess of each of these levels, the incident is stored.

Figure 3:
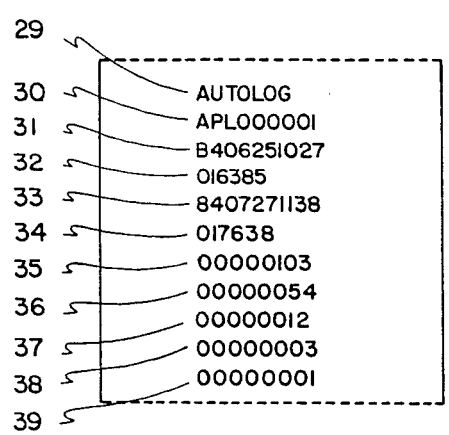
FIG. 3 is a plan view of a typical print-out of logged information.

Whenever it is desired to retrieve the information stored in the memory of the micro-computer, external switch 26 is manipulated which causes the computer to dump its memory in printed form from printer 20 as illustrated in FIG. 3. This example of a print-out shows the heading or title 29, the unique serial number of the unit 30, the date/time of the last print-out 31, the odometer reading at the last print-out 32, the date/time of the present print-out 33, the odometer reading at the present print-out 34, the cumulative occurrences speed was sensed between 56 and 60 miles per hour 35, the cumulative occurrences speed was sensed between 61 and 65 miles per hour 36, the cumulative occurrences speed was sensed between 66 and 70 miles per hour 37, the cumulative occurrences speed was sensed between 71 and 75 miles per hour 38, and the cumulative ocurrences speed was sensed 76 and above miles per hour 39.

The driver of the vehicle can monitor his driving performance by using the external data read-out 21. Also a father can monitor the driving performance of his teenage child after a date in the family car by using the external read-out display. Further, it can be useful in monitoring the driving performance of employees using company vehicles, and the like.

When obtaining a periodic print-out and memory dump of occurrence data, a special key or code incorporated into the system of the present invention must be used so that only authorized persons can obtain the stored information. This is particularly useful when a vehicle owner wants to monitor the performance of third-party drivers as well as people using the data for insurance rating and similar purposes.

The means of the present invention is designed to be tamperproof so that the accuracy of the data collected can be assured.

From the above it can be seen that the present invention has the advantage of providing interested parties with unique data concerning sensed increment speed violations. The equipment itself is relatively inexpensive to produce and is simple to install and use.

The present invention may, of course, be carried out in other specific ways that those herein set forth within departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An apparatus for monitoring the speed of a vehicle comprising:
   (a) data storage means operatively mounted in said vehicle for storing a plurality of predetermined speed levels, said data storage means including means for representing said speed levels as electrical signals;
   (b) means for sensing the speed of said vehicle and converting the same to an electrical signal indicative of the speed of said vehicle;
   (c) signal processing means for continuously comparing the speed of said vehicle with each of said speed levels during the operation of said vehicle to determine each occurance in which a vehicle accelerates beyond each particular speed level;
   (d) a number of separate registers equal to the number of preset speed levels so that every register is independently paired with a single speed level, each register incremented by said signal processing means when vehicle speed accelerates past the speed level paired with that register, so that said registers store the number of times the vehicle accelerates past each speed level; and
   (e) means for retrieving such stored information from said registers whereby the cumulative incremental speed performance of said vehicle can be determined.

2. The apparatus of claim 1 wherein said means for comparing the speed of said vehicle to said predetermined speed levels includes a micro-computer.

3. The apparatus of claim 2 wherein said sensing means is a magnetic pickup securable to a driveshaft of a vehicle and operatively connected to said micro-computer.

4. The apparatus of claim 1 wherein said retrieving means includes display means connected to said counting means for displaying the number of times each speed level is exceeded.

5. The apparatus of claim 1 wherein said retrieving means includes an alphanumeric printer for printing the number of times each speed level is exceeded.

* * * * *